(12) United States Patent
Nagasawa (10) Patent No.: US 8,690,979 B2
(45) Date of Patent: Apr. 8, 2014

(54) DUST COLLECTION DEVICE FOR CONCRETE CUTTER

(75) Inventor: Kenichi Nagasawa, Hasuda (JP)

(73) Assignee: Mikasa Sangyo Co., Ltd., Tokyo (JP)

( * ) Notice: Subject to any disclaimer, the term of this patent is extended or adjusted under 35 U.S.C. 154(b) by 225 days.

(21) Appl. No.: 13/304,072

(22) Filed: Nov. 23, 2011

(65) Prior Publication Data

US 2012/0124948 A1     May 24, 2012

(30) Foreign Application Priority Data

Nov. 24, 2010 (JP) ................ 2010-260769

(51) Int. Cl.
*B01D 50/00* (2006.01)

(52) U.S. Cl.
USPC ........... 55/337; 55/326; 55/340; 55/467; 55/471; 55/459.1; 55/342; 55/346; 55/349; 55/345

(58) Field of Classification Search
USPC ........ 55/337, 326, 340, 467, 471, 459.1, 342, 55/346, 349, 345
See application file for complete search history.

(56) References Cited

U.S. PATENT DOCUMENTS 2,572,862 A * 10/1951 Israel ................ 406/2
3,235,239 A * 2/1966 Petersen ............ 106/750

FOREIGN PATENT DOCUMENTS

JP    2006-241825 A    9/2006

* cited by examiner

*Primary Examiner* — Dung H Bui
(74) *Attorney, Agent, or Firm* — Holtz, Holtz, Goodman & Chick, PC (57) ABSTRACT

A dust collection device for a concrete cutter includes a suction duct disposed on an upstream-most side; a plurality of dust collectors of a cylindrical cyclone system disposed in series downstream of the suction duct; and a plurality of dust collection chambers connected respectively to the plurality of dust collectors and storing individually dust separated in each of the dust collectors. A blower is disposed between any two of the plurality of dust collectors and performs intake and discharge of air by rotation of a built-in fan. A return flow channel communicates the suction duct with the dust collection chamber which is connected via a connection portion to a dust collector disposed on a downstream-most side from among the plurality of dust collectors, or a return flow channel communicates the suction duct with the connection portion.

20 Claims, 6 Drawing Sheets

DUST COLLECTION DEVICE FOR CONCRETE CUTTER

BACKGROUND OF THE INVENTION

1. Field of the Invention

The present invention relates to a dust collection device, and more particularly to a dust collection device for a concrete cutter that is used for recovering dust such as cutting chips generated when cutting a road pavement or the like with a concrete cutter.

2. Description of the Related Art

When a cutting operation is performed with a concrete cutter with respect to a road pavement or concrete, dust such as cutting chips is generated. The dust should be recovered as industrial waste. The so-called "wet method" and "dry method" are known as dust recovery methods in the conventional concrete cutters.

In the wet dust recovery method, water is supplied from a tank during the cutting operation, the dust is adsorbed by the water and the resultant mud is recovered. With the dry dust recovery method, air inside a blade cover that covers the cutter blade is sucked in by a dust collection device and the dust is recovered.

The advantage of the wet dust recovery method is that even very fine dust (fine particles) can be reliably recovered, but the drawback is that a large amount of water should be prepared for the operation. In addition the recovered muddy water cannot be directly discarded and should be taken back from the operation site and finally subjected to filtration to separate water and dust.

By contrast, no water should be prepared in the dry dust recovery method, final filtration operation is unnecessary, and the method is easy to implement. However, problems are associated with the performance of the dust collection device used, very fine dust cannot be effectively separated and recovered, and some dust is released into the atmosphere.

SUMMARY OF THE INVENTION

It is an object of the present invention to resolve the problems inherent to the above-described conventional technology and provide a dust collection device for a concrete cutter that makes it possible to separate and recover effectively even very fine dust.

The dust collection device for a concrete cutter in accordance with the present invention includes: a suction duct disposed on an upstreammost side; a plurality of dust collectors of a cylindrical cyclone system that are disposed in series downstream of the suction duct; a plurality of dust collection chambers connected respectively to the plurality of dust collectors (or to all of the dust collectors, except the dust collector disposed on the downstreammost side from among the plurality of dust collectors) and storing individually dust separated in each of the dust collectors (except the dust collector disposed on the downstreammost side when the dust collection chamber is not connected to the dust collector disposed on the downstreammost side); a blower disposed between any two dust collectors from among the plurality of dust collectors and configured to perform intake and discharge of air by rotation of a built-in fan; a return flow channel communicating the suction duct with a dust collection chamber which is connected via a connection portion to the dust collector disposed on a downstreammost side from among the plurality of dust collectors, or a return flow channel communicating the suction duct with the connection portion, or a return flow channel communicating the suction duct with the dust collector disposed on the downstreammost side.

It is preferred that the dust collection device for a concrete cutter have a first dust collector, a second dust collector, and a third dust collector as the plurality of dust collectors, and it is also preferred that the first dust collector, the second dust collector, and the third dust collector each have an intake port, a discharge port, a cyclone chamber, an introducing portion, and a discharge tube; the blower have an intake port and a discharge port; the suction duct be connected to the intake port of the first dust collector, the discharge port of the first dust collector be connected to the intake port of the second dust collector, the discharge port of the second dust collector be connected to the intake port of the blower, the discharge port of the blower be connected to the intake port of the third dust collector, and when the blower is driven, air located close to the suction duct flow into the suction duct and be discharged to the outside of the device through the first dust collector, the second dust collector, the blower, and the third dust collector; and when the air passes through the dust collectors, a swirling flow be generated in the cyclone chambers and dust included in the air be separated and stored in the dust collection chambers.

Further, in this dust collection device for a concrete cutter, it is preferred that a dust collector having a structure in which two or more cyclone chambers with a diameter less than that of the cyclone chamber of the first dust collector be disposed as the second dust collector, and that a dust collector in which the entire cyclone chamber is formed in a cylindrical shape, a portion of the discharge tube that is inserted into the cyclone chamber is constituted by a cylindrical filter, and in which a length dimension is set greater than ½ of a dimension in an axial direction of the cyclone chamber be disposed as the third dust collector.

The dust collection device for a concrete cutter in accordance with the present invention enables highly efficient recovery of dust such as cutting chips generated when performing a cutting operation with respect to a road pavement or concrete and can recover effectively even very fine dust.

DESCRIPTION OF THE PREFERRED EMBODIMENTS

Figure 1:
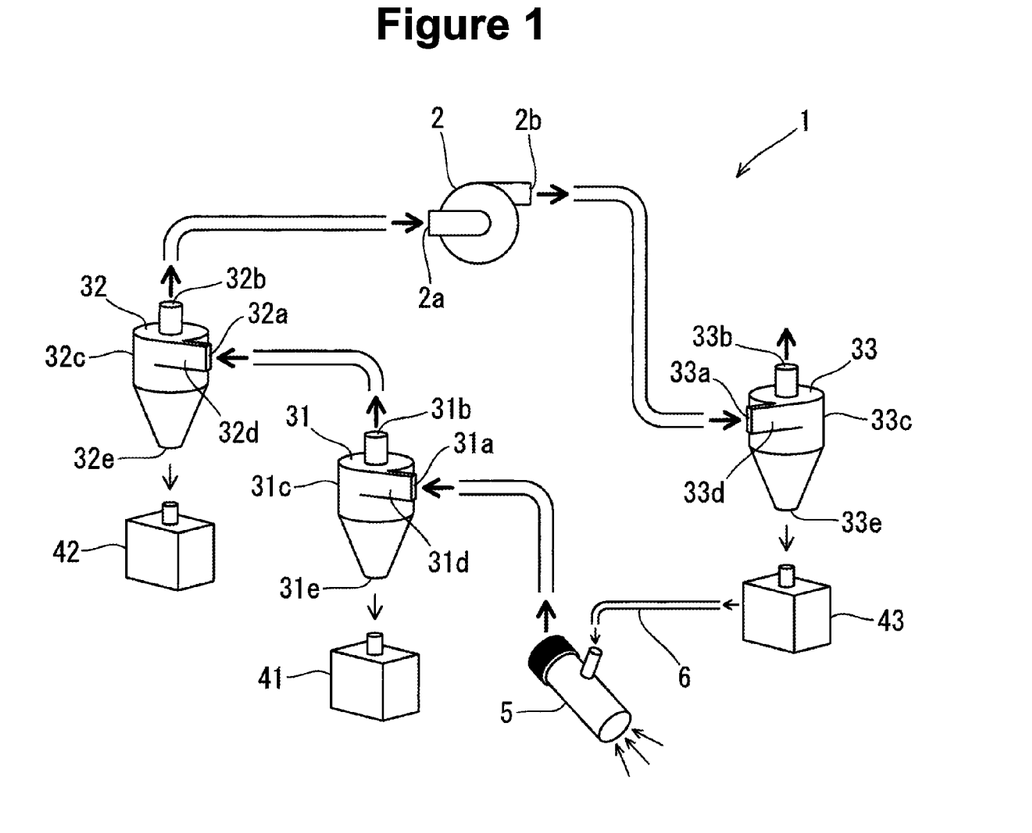
FIG. 1 is a configuration diagram of the dust collection device 1 according to the first embodiment of the present invention.

The embodiments of the "dust collection device" in accordance with the present invention will be explained below. The dust collection device 1 in accordance with the present invention is mounted on a concrete cutter and serves to recover dust such as cutting chips generated in the operation of cutting a road pavement or the like. As shown in FIG. 1, the dust collection device 1 according to the first embodiment of the present invention is constituted by a blower 2, three dust collectors (a first dust collector 31, a second dust collector 32, a third dust collector 33), three dust collection chambers (a first dust collection chamber 41, a second dust collection chamber 42, a third dust collection chamber 43), and a suction duct 5.

The blower 2 is constituted by a casing having an intake port 2a and a discharge port 2b and a fan installed inside the casing. When the fan is rotated by a rotary drive power supplied from a drive power source, the air is sucked in from the intake port 2a and the air that has flown into the casing is discharged from the discharge port 2b. It is preferred that part of the drive power of the drive engine of the concrete cutter (for example, an engine or an electric motor that rotates the cutter blade) be used as the drive power source of the blower 2, but a special electric motor may be also installed and used as the drive power source.

The first dust collector 31 is a dust collector of a cylindrical cyclone system that is constituted by a vertical (axial line is vertical) cyclone chamber 31c having a cylindrical portion and a conical portion, an introducing portion 31d connected to the cylindrical portion of the cyclone chamber 31c, and a discharge tube 31f disposed coaxially with the cyclone chamber 31c in the center of the cyclone chamber 31c. The introducing portion 31d has an intake port 31a open at one end (outer end portion), and the opposite end portion thereof is connected so as to extend along the tangential direction of the circumferential wall of the cylindrical portion of the cyclone chamber 31c. The discharge tube 31f is constituted by a portion inserted into the cyclone chamber 31c and a portion protruding upward (outside) of the cyclone chamber 31c. An air discharge port 31b is open at the outside end portion of the discharge tube 31f, and the opposite end portion (lower end) of the discharge tube 31f is open in the central portion inside the cyclone chamber 31c.

The second dust collector 32 and the third dust collector 33 are cylindrical cyclone dust collectors identical in configuration to the first dust collector 31 and have intake ports 32a, 33a, discharge ports 32b, 33b, cyclone chambers 32c, 33c, introducing ports 32d, 33d, and discharge tubes 32f, 33f.

The first dust collection chamber 41 serves to store the dust separated by the first dust collector 31 from the air. The first dust collection chamber 41 is disposed below the first dust collector 31 and air-tightly connected to a dust discharge port 31e formed at the lower end of the cyclone chamber 31c. Further, the first dust collection chamber 41 is in a sealed state, except that it communicates with the air inside the first dust collector 31.

The second dust collection chamber 42 is similar to the first dust collection chamber 41, disposed below the second dust collector 32, connected to a dust discharge port 32e formed at the lower end of the cyclone chamber 32c of the second dust collector 32, and in a sealed state, except that it communicates with the air inside the second dust collector 32. The first dust collection chamber 41 and the second dust collection chamber 42 individually store the dust separated in the respective dust collectors (first dust collector 31 and second dust collector 32) connected thereto.

The third dust collection chamber 43 is disposed below the third dust collector 33 and connected to a dust discharge port 33e formed at the lower end of the cyclone chamber 33c of the third dust collector 33.

The suction duct 5 serves to take in the dust by sucking in the air located inside a blade cover that covers the cutter blade of the concrete cutter and remove the dust from the air under the blade cover. The suction duct 5 is fixed so that the distal end thereof is open on the inner side of the blade cover.

The dust collection device 1 is configured such that the three dust collectors (first dust collector 31, second dust collector 32, third dust collector 33) are connected in series, the suction duct 5 is disposed on the upstreammost side thereof, and the blower 2 is disposed between the second dust collector 32 and the third dust collector 33. More specifically, the suction duct 5 is air-tightly connected to the intake port 31a of the first dust collector 31, the air discharge port 31b of the first dust collector 31 is air-tightly connected to the intake port 32a of the second dust collector 32, and the air discharge port 32b of the second dust collector 32 is connected to the intake port 2a of the blower 2. The discharge port 2b of the blower 2 is connected to the intake port 33a of the third dust collector 33, and the air discharge port 33b of the third dust collector 33 is open to the space outside the device.

The third dust collection chamber 43 (the dust collection chamber connected to the dust collector disposed on the downstreammost side, from among the three dust collectors) and the suction duct 5 are connected to each other by a return flow channel 6, and the inner space of the third dust collection chamber 43 communicates with the space inside the suction duct 5.

The operation of the dust collection device 1 according to the present embodiment will be explained below. Where the blower 2 is driven, the air upstream of the intake port 2a is sucked in. As a result, a suction force is generated at the distal end of the suction duct 5 positioned at the upstreammost side of the blower 2, the air in the vicinity of the suction duct 5 is sucked in, and this air flows into the suction duct 5. The air that has flown into the suction duct 5 flows down to the blower 2 via the first dust collector 31 and the second dust collector 32 and then flows into the blower 2. The air that has flown into the blower 2 is discharged to the downstream side from the discharge port 2b and discharged to the outside of the device through the third dust collector 33.

Where the dust collection device 1 is actuated in the case in which dust is present in the space in front of the distal end of the suction duct 5 or in the space on the circumference thereof, dust is sucked in together with the air from the distal end of the suction duct 5 that generates the suction power. The air and dust that have flown into the suction duct 5 flow down toward the first dust collector 31 and flow into the cyclone chamber 31c from the intake port 31a of the first dust collector 31.

Since the introducing portion 31d between the intake port 31a and the cyclone chamber 31c extends along the tangential direction of the circumferential wall (circumferential wall of the cyclone chamber 31c in the site of connection to the introducing portion 31d) of the cyclone chamber 31c, the air that has flown in from the intake port 31a and flown into the cyclone chamber 31c via the introducing portion 31d flows along the inner wall surface of the cyclone chamber 31c. As a result, a swirling flow of the introduced air occurs inside the cyclone chamber 31c. The dust that has flown into together with the air is carried by the swirling flow and swirls inside the cyclone chamber 31c. The dust that is heavier than the air is distributed by the centrifugal force along the inner wall surface of the cyclone chamber 31c, and comparatively pure air (first purified air) is distributed in the central portion (close to the central axial line) of the cyclone chamber 31c.

Figure 2:
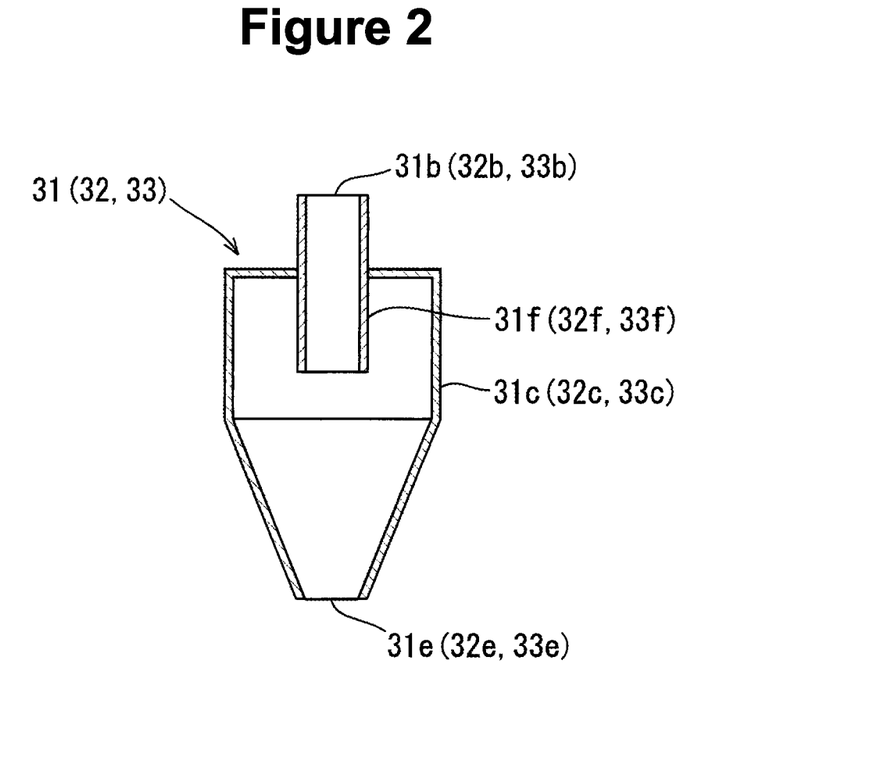
FIG. 2 is a cross-sectional view of the first dust collector 31 (second dust collector 32, third dust collector 33) shown in FIG. 1.

As shown in FIG. 2, the discharge tube 31f having the air discharge port 31b open at the outer end portion is disposed coaxially with the cyclone chamber 31c in the center of the cyclone chamber 31c. Therefore, the first purified air accumulated in the central portion of the cyclone chamber 31c is discharged from the air discharge port 31b. This first purified air can include comparatively fine dust that could not be separated by the first dust collector 31.

The dust swirling along the inner wall surface of the cyclone chamber 31c gradually moves down inside the cyclone chamber 31c under gravity and is eventually discharged from the dust discharge port 31e formed at the lower end of the cyclone chamber 31c, falls into the first dust collection chamber 41 and is stored therein.

The first purified air discharged from the air discharge port 31b of the first dust collector 31 flows down toward the second dust collector 32 and flows from the intake port 32a of the second dust collector 32 into the cyclone chamber 32c. The second dust collector 32 has a structure identical to that of the first dust collector 31, and the first purified air that has flown into the cyclone chamber 32c of the second dust collector 32 swirls along the inner wall surface of the cyclone chamber 32c similarly to the air that has flown into the first dust collector 31. When comparatively fine dust is included in the first purified air, the dust is distributed along the inner wall surface of the cyclone chamber 32c by the centrifugal force, and the air of higher purity (second purified air) is distributed in the central portion of the cyclone chamber 32c.

Since the discharge tube 32f of the second dust collector 32 is also disposed in the center of the cyclone chamber 32c, the second purified air accumulated in the central portion of the cyclone chamber 32c is discharged from the air discharge port 32b. The second purified air can include fine particles that could not be separated in the second dust collector 32.

The dust swirling along the inner wall surface of the cyclone chamber 32c gradually moves down inside the cyclone chamber 32c under gravity and is eventually discharged from the dust discharge port 32e formed at the lower end of the cyclone chamber 32c, falls into the second dust collection chamber 42 and is stored therein.

The second purified air discharged from the air discharge port 32b of the second dust collector 32 flows down toward the third dust collector 33 through the blower 2 and flows from the intake port 33a of the third dust collector 33 into the cyclone chamber 33c. The third dust collector 33 also has a structure identical to that of the first dust collector 31, and the second purified air that has flown into the cyclone chamber 33c of the third dust collector 33 swirls along the inner wall surface of the cyclone chamber 33c similarly to the air that has flown into the first dust collector 31. When fine particles are included in the second purified air, the fine particles are distributed along the inner wall surface of the cyclone chamber 33c by the centrifugal force, and the air of higher purity (third purified air) is distributed in the central portion of the cyclone chamber 33c.

Since the discharge tube 33f of the third dust collector 33 is also disposed in the center of the cyclone chamber 33c, the third purified air accumulated in the central portion of the cyclone chamber 33c is discharged from the air discharge port 33b. The air discharge port 33b is opened toward the outside of the device, and the third purified air is released to the atmosphere. The fine particles swirling along the inner circumferential wall of the cyclone chamber 33c is gradually guided downward and eventually discharged from the dust discharge port 33e formed at the lower end of the cyclone chamber 33c and flows down toward the third dust collection chamber 43.

This feature will be explained below in greater detail. When the fine particles swirling along the inner wall surface of the cyclone chamber 33c have a certain mass, the fine particles gradually move downward inside the cyclone chamber 33c under gravity, but since the fine particles that can flow into the cyclone chamber 33c have a very small mass, it is difficult to cause these fine particles to move downward inside the cyclone chamber 33c by the gravity force alone. Therefore, the introduced fine particles are likely to be retained in a state of continuous swirling inside the cyclone chamber 33c. In this case, the fine particles that continue flowing into the cyclone chamber 33c are accumulated therein, the layer of fine particles swirling inside the cyclone chamber 33c gradually increases in thickness toward the radially inner side, and the distribution range of fine particles can be expanded to reach the vicinity of the central portion of the cyclone chamber 33c where the discharge tube 33f is disposed. The fine particles distributed in the vicinity of the central portion can flow into the discharge tube 33f and can be discharged from the air discharge port 33b to the outside of the device.

In the present embodiment, as described hereinabove, the third dust collection chamber 43 and the suction duct 5 are connected to each other via the return flow channel 6, and the inner space of the third dust collection chamber 43 communicates with the inner space of the suction duct 5. Since the air upstream of the blower 2 is sucked in when the blower 2 is driven, a negative pressure is formed inside the suction duct 5 positioned upstream of the blower 2. Since the air is continuously pushed out downstream of the blower 2, a positive pressure is formed inside the third dust collector 33 and the third dust collection chamber 43 positioned downstream of the blower 2. Therefore, an air flow from the third dust collection chamber 43 toward the suction duct 5 is generated in the return flow channel 6 connecting the third dust collection chamber 43 under a positive pressure and the suction duct 5 under a negative pressure. In addition, an air flow is also generated from the third dust collector 33 toward the third dust collection chamber 43.

Fine particles swirling along the inner wall surface of the cyclone chamber 33c are guided by the air flow, gradually descend, while swirling inside the cyclone chamber 33c, are discharged from the dust discharge port 33e formed at the lower end, and smoothly flow down into the third dust collection chamber 43. Therefore, the above-described problem (fine particles that have flown into the cyclone chamber 33c continuously swirl therein, the layer in which the fine particles are distributed expands to the vicinity of the central portion of the cyclone chamber 33c, and the fine particles flow into the discharge tube 33f and are discharged to the outside of the device) can be advantageously avoided and very high performance in separation and recovery of fine particles can be expected.

The inner diameter of the return flow channel 6 is less than the inner diameter of the discharge tube 33f or air discharge port 33b of the third dust collector 33. Therefore, the amount of air flowing from the third dust collection chamber 43 into the suction duct 5 through the return flow channel 6 is less than the amount of air discharged from the air discharge port 33b.

In the present embodiment, the first dust collector 31, second dust collector 32, and third dust collector 33 have the same structure, but because characteristics of dust flowing into each dust collector are different, a dust collector with a structure corresponding to the respective characteristics may be disposed at each position.

This feature will be explained below in greater detail. The entire dust sucked in from the suction duct 5 flows into the first dust collector 31 and most of the dust (about 90%) is separated and recovered in the first dust collector 31, but the remaining dust (comparatively fine dust) that has not been separated in the first dust collector 31 can flow into the second dust collector 32. Therefore, it is preferred that a dust collector having a structure enabling more effective separation and recovery of comparatively fine dust, for example, a structure in which two (or three or more) cyclone chambers with a diameter less than that of the first dust collector 31 are used together, the first purified air flowing in from the intake port is branched in an intermediate section of the flow channel thereof so as to flow into each cyclone chamber, the second purified air discharged from each cyclone chamber is mixed in the intermediate section of the flow channel thereof, and the mixture is discharged from the discharge port, be used as the second dust collector 32.

When a dust collector provided with a plurality of cyclone chambers is used as the second dust collector 32, it is preferred that dust collection chambers be prepared individually for each cyclone chamber and that each dust collection chamber be air-tightly connected to the respective cyclone chamber.

Figure 3:
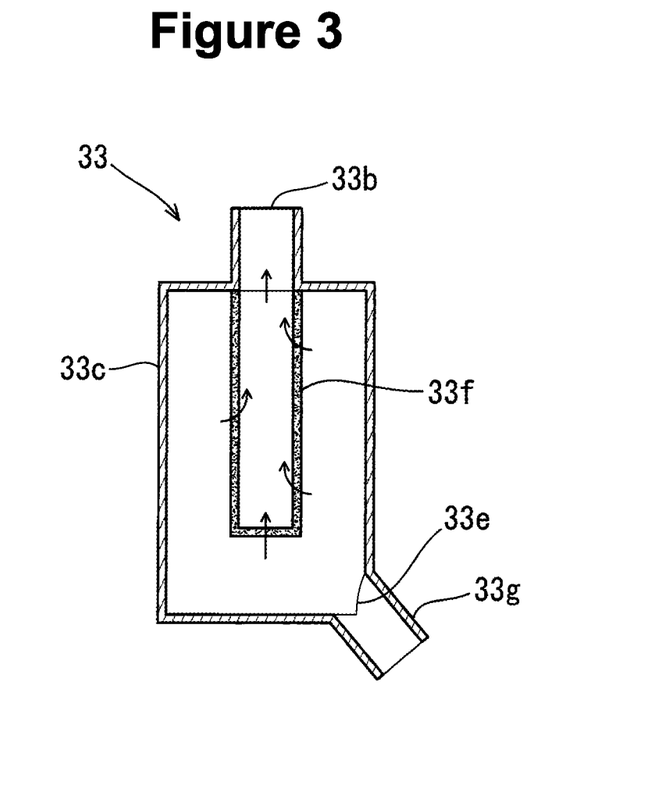
FIG. 3 is a cross-sectional view illustrating the third dust collector 33 used in the dust collection device 1 according to the second embodiment of the present invention.

Since very fine dust (fine particles) that has not been separated in the second dust collector 32 can flow into the third dust collector 33, it is preferred that a dust collector with a structure enabling more effective separation and recovery of the very fine dust, for example, the dust collector with a structure such as shown in FIG. 3, be used as the third dust collector 33.

Accordingly, the dust collection device 1 that is configured by using the third dust collector 33 shown in FIG. 3 instead of the third dust collector 33 shown in FIG. 1 is explained herein as the second embodiment of the present invention. In the third dust collector 33 used in the dust collection device 1 according to the present embodiment, as shown in FIG. 3, the entire cyclone chamber 33c is formed in a cylindrical shape and the portion of the discharge tube 33f disposed inside the cyclone chamber 33c is configured as a cylindrical filter (the filter that captures extremely fine particles and blocks the passage thereof, while allowing the air to pass). The portion of the discharge tube 33f disposed inside the cyclone chamber 33c is set to have a length dimension (height dimension) larger than that of the discharge tube 31f of the first dust collector 31 shown in FIG. 2, more specifically larger than ½ of the dimension (inner size) in the axial direction of the cyclone chamber 33c. The reference symbol 33g in FIG. 3 denotes a connection portion that connects the third dust collector 33 and the third dust collection chamber 43 disposed therebelow.

In the third dust collector 33, the introducing portion also extends along the tangential direction of the circumferential wall of the cyclone chamber 33c. Therefore, where the second purified air flows into the cyclone chamber 33c, the air flows and swirls along the inner wall surface of the cyclone chamber 33c. When fine particles are included in the second purified air, these particles are distributed along the inner wall surface of the cyclone chamber 33c by the centrifugal force and the air of higher purity (third purified air) is distributed in the central portion of the cyclone chamber 33c, more specifically below the discharge tube 33f (filter) and in the vicinity of the cylindrical side portion of the discharge tube 33f.

In the third dust collector 33, the third purified air accumulated below the discharge tube 33f and in the vicinity of the cylindrical side portion thereof flows inward from the lower surface side of the discharge tube 33f and the outer circumferential surface side of the cylindrical side portion (in other words, flows through the filter) and is discharged from the air discharge port 33b to the outside of the device. In this case, since the third purified air is filtered by the filter, the air purified to a higher degree is discharged to the outside of the device.

In the example shown in FIG. 3, not only the cylindrical side portion, but also the lower surface of the discharge tube 33f is constituted as a filter, but the lower surface of the discharge tube 33f may be constituted by a material that does not allow the air to penetrate. In this case, the third purified air flows inside from the outer circumferential surface side of the cylindrical side portion of the discharge tube 33f through the filter and is discharged to the outside of the device from the air discharge port 33b.

Figure 4:
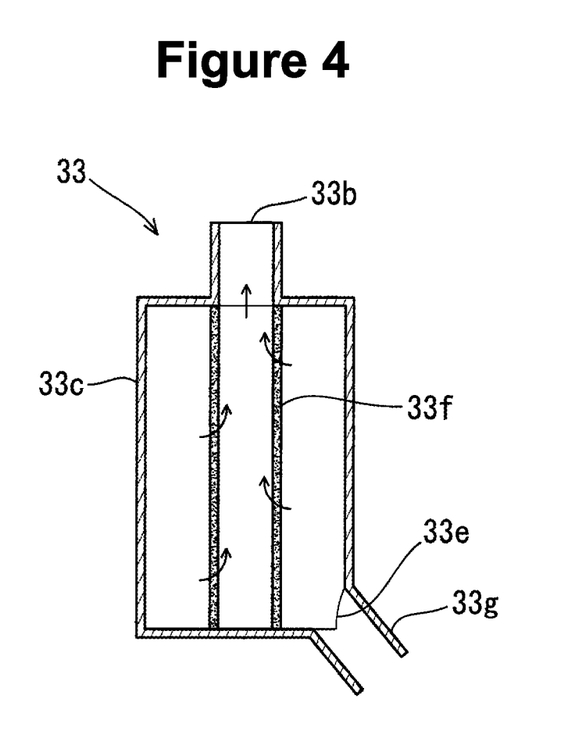
FIG. 4 is a cross-sectional view illustrating another configuration example of the third dust collector 33.

As shown in FIG. 4, the third dust collector 33 can have a structure in which the lower end of the discharge tube 33f constituted as a filter (end portion on the side opposite that of the air discharge port 33b) reaches the bottom surface of the cyclone chamber 33c (the surface that is on the bottom side when the cyclone chamber 33c is held in the direction such that the axial line is vertical and the introducing portion is on the upper side).

Where the dust collection device 1 using the third dust collector 33 shown in FIG. 3 or FIG. 4 is used over a certain period, fine particles accumulate in the discharge tube 33f as a result of filtration performed with the filter constituting the discharge tube 33f. When the accumulated fine particles are cleaned, the suction duct 5 fixed to the blade cover is removed, the discharge tube 33f is removed from inside the third dust collector 33, and the blower 2 is driven in a state in which the discharge tube 33f is lifted in front of the suction duct 5. As a result, the fine particles that have accumulated inside the discharge tube 33f are sucked in from the suction duct 5 and pass through a filtration path from the first dust collector 31 to the third dust collector 33. In this process the fine particles are separated from air and recovered.

In the dust collection device 1 shown in FIG. 1, the return flow channel 6 is connected so as to be disposed between the third dust collection chamber 43 and the suction duct 5 and communicate the two with each other, but a configuration may be also used in which a branch point is provided in the connection portion that connects the third dust collector 33 and the third dust collection chamber 43, the return flow channel 6 is disposed between the branch point and the suction duct 5, and the connection portion and the suction duct 5 are communicated with one another.

In another possible configuration, the third dust collection chamber 43 connected to the third dust collector 33 (the dust collector disposed on the downstreammost side from among the three dust collectors) is omitted, one end of the return flow channel 6 is connected directly or by a connection portion to the dust discharge port 33e of the third dust collector 33, and the third dust collector 33 and the suction duct 5 are communicated with one another by the return flow channel 6. In this case, all of the fine particles separated from the air in the third dust collector 33 pass through the return flow channel 6 and the suction duct 5, flow down toward the first dust collector 31, and are separated and recovered in the first dust collector 31 or second dust collector 32.

In the dust collection device 1 shown in FIG. 1, the blower 2 is disposed between the second dust collector 32 and the third dust collector 33, but the blower may be disposed between any two dust collectors from among the three dust collectors. In other words, the blower can be also disposed between the first dust collector 31 and the second dust collector 32. Further, when a fourth dust collector is disposed downstream of the third dust collector 33, the blower can be disposed between the third dust collector 33 and the fourth dust collector.

Figure 5:
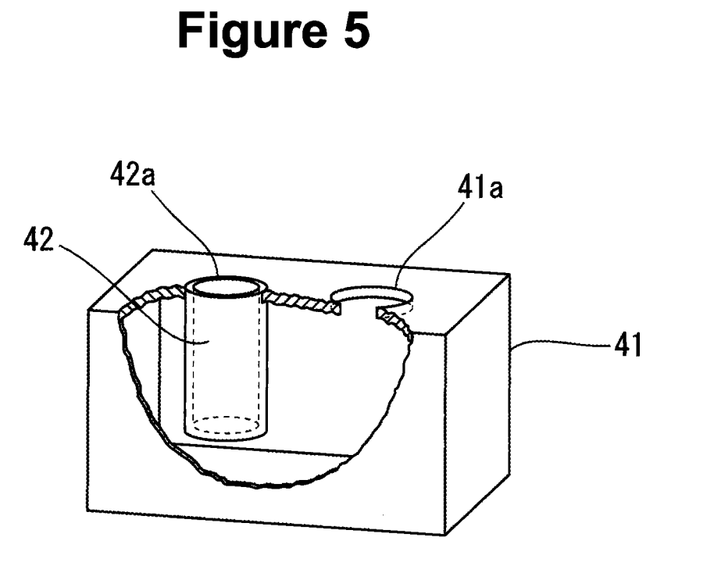
FIG. 5 is a partially cut-out perspective view illustrating another configuration example of the first dust collection chamber 41 and the second dust collection chamber 42.

In the dust collection device 1 shown in FIG. 1, the first dust collection chamber 41 and the second dust collection chamber 42 (the dust collection chambers connected to the dust collectors positioned upstream of the blower) are disposed at mutually separated positions, but it is also possible to partition the inside of a single box-like member, form two (or three or more) small air-tight chambers, and use one of the small chambers as the first dust collection chamber 41 and the other small chamber as the second dust collection chamber 42. Further as shown in FIG. 5, it is also possible to provide a small air-tight chamber in the internal space of the first dust collection chamber 41, use this small chamber as the second dust collection chamber 42, and air-tightly connect an opening 42a in the upper side thereof to the second dust collector 32.

Figure 6:
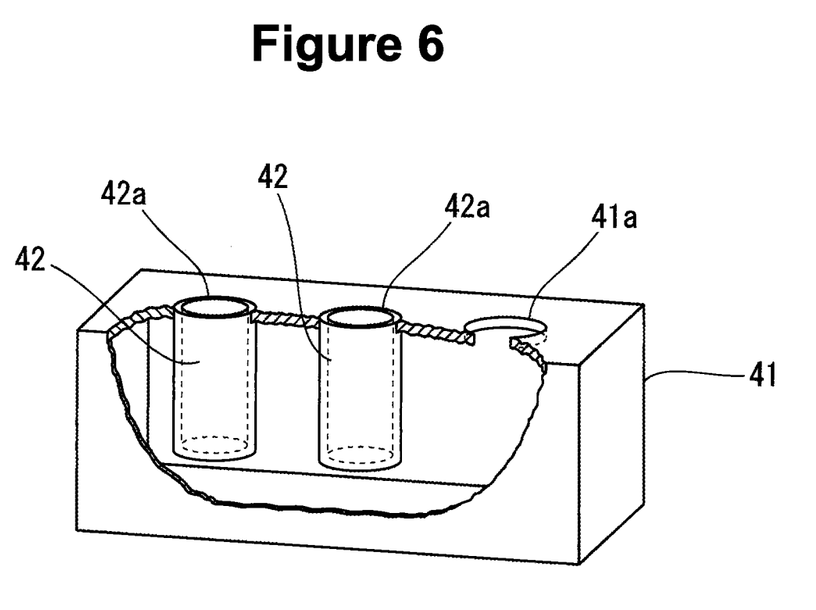
FIG. 6 is a partially cut-out perspective view illustrating another configuration example of the first dust collection chamber 41 and the second dust collection chamber 42.

When a dust collector with a structure in which two (or three or more) cyclone chambers are provided is used as the second dust collector 32, it is preferred that, as shown in FIG. 6, two small air-tight chambers (the number of small chambers is equal to the number of cyclone chambers) be provided in the internal space of the first dust collection chamber 41, these small chambers be taken as the second dust collection chambers 42, and the openings 42a in the upper side thereof be air-tightly and individually connected to the cyclone chambers of the second dust collector 32.

When the first dust collection chamber 41 and other dust collection chambers are thus formed in a state in which mutual air-tightness thereof is ensured in a single box-like member, the entire dust that has been stored in the dust collection chambers can be removed from the dust collection device 1 and discarded by a single operation and the efficiency of operation can be increased.

In the case of a configuration such that the purified air discharged from the third dust collector 33 is blown toward elements such as a drive V belt or a fan of the concrete cutter equipped with the dust collection device 1, these elements can be advantageously cooled.

In the configurations shown in FIGS. 1, 3, and 4, the third dust collector 33 is held so that the axial line of the cyclone chamber 33c is vertical, but the third dust collector 33 can be also held so that the axial line is horizontal. The first dust collector 31 and the second dust collector 32 can be similarly held so that the axial lines thereof are horizontal.

Further, in another possible configuration, the air flows into the cyclone chambers 31c to 33c from the tangential direction of a spiral circular trajectory so that the air introduced into the cyclone chambers 31c to 33c of the first dust collector 31, the second dust collector 32, and the third dust collector 33 move inside the cyclone chambers 31c to 33c toward the dust discharge ports 31e to 33e, while rotating along a spiral trajectory, instead of rotating along the same trajectory around the axial line. Further, means for deflecting the swirling flow of air introduced into the cyclone chambers 31c to 33c can be disposed inside the cyclone chambers 31c to 33c or a structure of the inner wall surface of the cyclone chambers 31c to 33c can be such as to deflect the swirling flow of the inflowing air in the spiral direction.

What is claimed is:

1. A dust collection device for a concrete cutter, comprising:
    a suction duct disposed on an upstream-most side;
    a plurality of dust collectors of a cylindrical cyclone system that are disposed in series downstream of the suction duct;
    a plurality of dust collection chambers connected respectively to the plurality of dust collectors and storing individually dust separated in each of the dust collectors;
    a blower disposed between any two dust collectors from among the plurality of dust collectors and configured to perform intake and discharge of air by rotation of a built-in fan; and
    a return flow channel which communicates the suction duct with one of (i) the dust collection chamber, which is connected via a connection portion to a dust collector disposed on a downstream-most side from among the plurality of dust collectors, and (ii) the connection portion.

2. A dust collection device for a concrete cutter, comprising:
    a suction duct disposed on an upstream-most side;
    a plurality of dust collectors of a cylindrical cyclone system that are disposed in series downstream of the suction duct;
    a plurality of dust collection chambers connected respectively to all of the dust collectors, except a dust collector disposed on a downstream-most side from among the plurality of dust collectors, and storing individually dust separated in each dust collector except the dust collector disposed on the downstream-most side;
    a blower disposed between any two dust collectors from among the plurality of dust collectors and configured to perform intake and discharge of air by rotation of a built-in fan; and
    a return flow channel communicating the suction duct with the dust collector disposed on the downstream-most side from among the plurality of dust collectors.

3. The dust collection device for a concrete cutter according to claim 1, wherein the plurality of dust collectors comprises a first dust collector, a second dust collector, and a third dust collector,
    wherein:
    the first dust collector, the second dust collector, and the third dust collector each have an intake port, an air discharge port, a cyclone chamber, an introducing portion, and a discharge tube;
    the blower has an intake port and a discharge port;
    the suction duct is connected to the intake port of the first dust collector, the air discharge port of the first dust collector is connected to the intake port of the second dust collector, the air discharge port of the second dust collector is connected to the intake port of the blower, the discharge port of the blower is connected to the intake port of the third dust collector, and when the blower is driven, air located close to the suction duct flows into the suction duct and is discharged to outside of the dust collection device through the first dust collector, the second dust collector, the blower, and the third dust collector; and
    when the air passes through the dust collectors, a swirling flow is generated in the cyclone chambers and dust included in the air is separated and stored in the dust collection chambers.

4. The dust collection device for a concrete cutter according to claim 3, wherein the second dust collector has a structure including at least two cyclone chambers with a diameter less than a diameter of the cyclone chamber of the first dust collector.

5. The dust collection device for a concrete cutter according to claim 3, wherein in the third dust collector, an entire shape of the cyclone chamber is a cylindrical shape.

6. The dust collection device for a concrete cutter according to claim 3, wherein in the third dust collector, a portion of the discharge tube that is inserted into the cyclone chamber comprises a cylindrical filter, and a length dimension of said portion of the discharge tube is greater than ½ of a dimension of the cyclone chamber in an axial direction of the cyclone chamber.

7. The dust collection device for a concrete cutter according to claim 1, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

8. The dust collection device for a concrete cutter according to claim 4, wherein in the third dust collector, an entire shape of the cyclone chamber is a cylindrical shape.

9. The dust collection device for a concrete cutter according to claim 4, wherein in the third dust collector, a portion of the discharge tube that is inserted into the cyclone chamber comprises a cylindrical filter, and a length dimension of said portion of the discharge tube is greater than ½ of a dimension of the cyclone chamber in an axial direction of the cyclone chamber.

10. The dust collection device for a concrete cutter according to claim 5, wherein in the third dust collector, a portion of the discharge tube that is inserted into the cyclone chamber comprises a cylindrical filter, and a length dimension of said portion of the discharge tube is greater than ½ of a dimension of the cyclone chamber in an axial direction of the cyclone chamber.

11. The dust collection device for a concrete cutter according to claim 2, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

12. The dust collection device for a concrete cutter according to claim 3, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

13. The dust collection device for a concrete cutter according to claim 4, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

14. The dust collection device for a concrete cutter according to claim 5, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

15. The dust collection device for a concrete cutter according to claim 6, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

16. The dust collection device for a concrete cutter according to claim 8, wherein in the third dust collector, a portion of the discharge tube that is inserted into the cyclone chamber comprises a cylindrical filter, and a length dimension of said portion of the discharge tube is greater than ½ of a dimension of the cyclone chamber in an axial direction of the cyclone chamber.

17. The dust collection device for a concrete cutter according to claim 8, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

18. The dust collection device for a concrete cutter according to claim 9, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

19. The dust collection device for a concrete cutter according to claim 10, wherein the dust collection chambers comprise a plurality of chambers which are (i) formed in a single box-like member in a state that ensures mutual air-tightness thereof and (ii) individually connected to respective ones of the dust collectors that are positioned upstream of the blower.

20. The dust collection device for a concrete cutter according to claim 2, wherein the plurality of dust collectors comprises a first dust collector, a second dust collector, and a third dust collector, wherein:

the first dust collector, the second dust collector, and the third dust collector each have an intake port, an air discharge port, a cyclone chamber, an introducing portion, and a discharge tube;

the blower has an intake port and a discharge port;

the suction duct is connected to the intake port of the first dust collector, the air discharge port of the first dust collector is connected to the intake port of the second dust collector, the air discharge port of the second dust collector is connected to the intake port of the blower, the discharge port of the blower is connected to the intake port of the third dust collector, and when the blower is driven, air located close to the suction duct flows into the suction duct and is discharged to outside of the dust collection device through the first dust collector, the second dust collector, the blower, and the third dust collector; and when the air passes through the dust collectors, a swirling flow is generated in the cyclone chambers and dust included in the air is separated and stored in the dust collection chambers.

* * * * *